United States Patent
Lee

(10) Patent No.: US 7,407,116 B2
(45) Date of Patent: Aug. 5, 2008

(54) SPRAY WASHER STRUCTURE OF INSULATOR USED FOR AIRCRAFT

(75) Inventor: James Lee, Shalu Township, Taichung County (TW)

(73) Assignee: Emerald Pacific Airlines, Taichung County (TW)

( * ) Notice: Subject to any disclaimer, the term of this patent is extended or adjusted under 35 U.S.C. 154(b) by 49 days.

(21) Appl. No.: 11/284,829

(22) Filed: Nov. 23, 2005

(65) Prior Publication Data

US 2006/0237558 A1  Oct. 26, 2006

(30) Foreign Application Priority Data

Apr. 20, 2005  (TW) .............................. 94206198 U

(51) Int. Cl.
- *B64D 1/18* (2006.01)
- *B64D 1/00* (2006.01)
- *B05B 15/08* (2006.01)
- *B05B 15/06* (2006.01)
- *B05B 7/02* (2006.01)

(52) U.S. Cl. .................. 239/171; 239/176; 239/280; 239/280.5; 239/281; 239/525; 239/587.1; 239/587.5; 244/136; 248/81; 248/83

(58) Field of Classification Search ............... 239/171, 239/176, 280, 280.5, 281, 525, 587.1, 587.5, 239/200, 273, 289, 532, 587.2, 588; 248/81, 248/83, 75, 80; 244/136; 169/53, 51; 134/172, 134/34

See application file for complete search history.

(56) References Cited

U.S. PATENT DOCUMENTS

| | | | | | |
|---|---|---|---|---|---|
| 2,857,201 | A | * | 10/1958 | Palmer ....................... | 239/281 |
| 4,477,289 | A | * | 10/1984 | Kurtgis ........................ | 134/34 |
| 5,201,090 | A | * | 4/1993 | Jans ........................... | 15/88.4 |
| 5,248,436 | A | * | 9/1993 | Kovaletz ..................... | 210/693 |
| 5,904,165 | A | * | 5/1999 | McLean et al. ............. | 134/172 |
| 6,905,080 | B2 | * | 6/2005 | Pohorecki ................... | 239/280 |

* cited by examiner

*Primary Examiner*—Darren W Gorman
(74) *Attorney, Agent, or Firm*—Alan Kamrath; Kamrath & Associates PA

(57) ABSTRACT

A spray washer structure used for attaching to an aircraft and washing insulators on high-voltage transmission lines includes a pivot seat, a core tube, an inner tube, and a nozzle. The pivot seat is supported by a plurality of legs and a rear leg that are attached at the aircraft. The mid-section of the core tube is pivotally connected to the pivot seat by the use of a pivot, and an end portion of the core tube is connected to at least an inclined resilient buffer link at another end portion of the pivot. The innertube is passed through and pivoting within the core tube. The nozzle is secured at the front end of the inner tube by an adjustable joint. Moreover, the nozzle is also connected to a hose connected to a water source.

1 Claim, 4 Drawing Sheets

SPRAY WASHER STRUCTURE OF INSULATOR USED FOR AIRCRAFT

BACKGROUND OF THE INVENTION

1. Field of the Invention

The invention relates to a spray washer structure of insulator used for aircraft, and more particularly, to a spray washer structure of insulator used for aircraft that can steadily position, can be handy to operate, and can pivotally rotate the direction of the spray nozzle to facilitate the washing of the insulator.

2. Description of the Prior Art

Insulators that are equipped at the tower of high-voltage power-transmission-line and are used for insulation between the transmission-line and tower are very important components for the safety and security of facilities and people. However, the insulators needs to be cleaned periodically since the insulated function of the insulators tends to deteriorate due to their long-time exposure in the open space and their having dust adhered and foreign substance intruded. Nevertheless, as the tower of high-voltage power-transmission-line is generally too high to be reached for the operator to clean by the use of spray washer from the ground, aircraft such as helicopter is usually employed to clean the insulators FIG. 1 is a pictorial views of the spray washer structure of insulator of the prior art. As shown in FIG. 1, the spray washer structure of insulator of the invention includes a lance (82) and a hose (5). The hose (5) with one end connected to the a water source (a water tank) (not shown in the Figure) and the other end attached to a nozzle (83) is having the hose (5) inserted from the front end of the lance (82) and penetrated through the lance (82) to be exposed and secured at the tail end thereof. Moreover, the lance (82) having a pivot (821) at its middle section is supported by inserting the pivot (821) into a pivot seat (80). Furthermore, a plurality of legs (81) having hook-talons (811) at their bottom ends for hooking at the bottom cross-bars (not shown in the Figure) of an aircraft (such as a helicopter) have their top ends connected to and support the pivot seat (80).

A pull rope (84) is equipped near the nozzle (83) of the lance (82) for connecting to the fuselage of an aircraft (such as a helicopter). In addition, a handle (822) having a short bar or a short tube attached on each side of the lance (82) positioned at the tail end of the lance (82) is also provided.

When it comes to cleaning the insulator, the spray washer structure of the invention is first mounted on an aircraft (such as a helicopter) by connecting the pull rope (84) to the top of the fuselage of the aircraft (such as a helicopter) and hooking the hook-talons (811) on the cross-bar of the aircraft (such as a helicopter). The pull rope (84) can be pulled up to hold the lance (82) to avoid the lance (82) from being pushed downward by the airflow generated by the rotor of the helicopter. The aircraft (such as a helicopter) having the spray washer structure of the invention mounted then flies to approach the tower of high-voltage power-transmission line. Adequately pressurized water flow is sent through the hose (5) to the nozzle (83), and the operator controls the orientation of the nozzle (83) by holding the handle (822) to manipulate the spray washer. Adequate cleaning effect of the insulator can be achieved by injecting water beam through the nozzle (83) of the spray washer structure toward the insulator.

The insulator mounted at the general high-voltage power-transmission line appears scoop-disk in shape and having different orientation of arrangement and being built-up. Since the injecting water-beam effluent from the nozzle (83) is basically in a direction parallel to the lance (82) of the spray washer structure, the aircraft (such as a helicopter) will have to fly back-and-forth to adjust the orientation of the fuselage in order to search for a good angle to clean the scoop inner surface of the insulator. Consequently, the spray washing operation is energy and time-consuming, and will seriously affect the efficiency and quality of insulator cleaning.

Therefore, it has been an urgent plan and improvement project for the designers to resolve the above-mentioned problems.

SUMMARY OF THE INVENTION

In light of the above-mentioned demerits of the prior art, the invention provides a spray washer structure of insulator used for aircraft that aims to ameliorate at least some of the demerits of the prior art or to provide a useful alternative.

The primary objective of the invention is to provide a spray washer structure of insulator used for aircraft that is capable of adequately adjusting the direction of the nozzle according to the need by pivotally rotating the nozzle to facilitate the cleaning of the insulators that are disposed in different direction, thereby, to improve the cleaning efficiency and lower the operating cost.

The secondary objective of the invention is to provide a spray washer structure of insulator used for aircraft that is stable in positioning and is capable of effectively preventing the inner tube from being moving upward to touch the rotor of the helicopter, thereby, is safe in operation.

In order to achieve the above-mentioned objectives, a spray washer structure of insulator used for aircraft includes a pivot seat, a core tube, an inner tube, and a nozzle. The pivot seat is supported by a plurality of legs and a rear leg that are attached at the aircraft. The mid-section of the core tube is pivotally connected to the pivot seat by the use of a pivot, and an end portion of the core tube is connected to at least an inclined resilient buffer link at another end portion of the pivot. The inner tube being passed through and secured in the core tube in pivotally connected status is capable of facilitating the operation of controlling the pivoting rotation therein. The nozzle is secured at the front end of the inner tube by a pivotal joint which is bent and inclined as well as stretchy and rotatory. Moreover, the nozzle is also connected to a hose inserting from the front end of the inner tube and passing through it to be exposed at the rear end thereof to be connected to a water source that is provided beforehand. By the use of the pivoted inner tube in association with the bent and inclined as well as stretchy and rotatory joint, the nozzle is capable of forming various orientation in different directions to fit for the insulators having different arrangement and built-up directions.

The accomplishment of this and other objectives of the invention will become apparent from the following description and its accompanying drawings of which:

DETAILED DESCRIPTION OF THE PREFERRED EMBODIMENT

Figure 1:
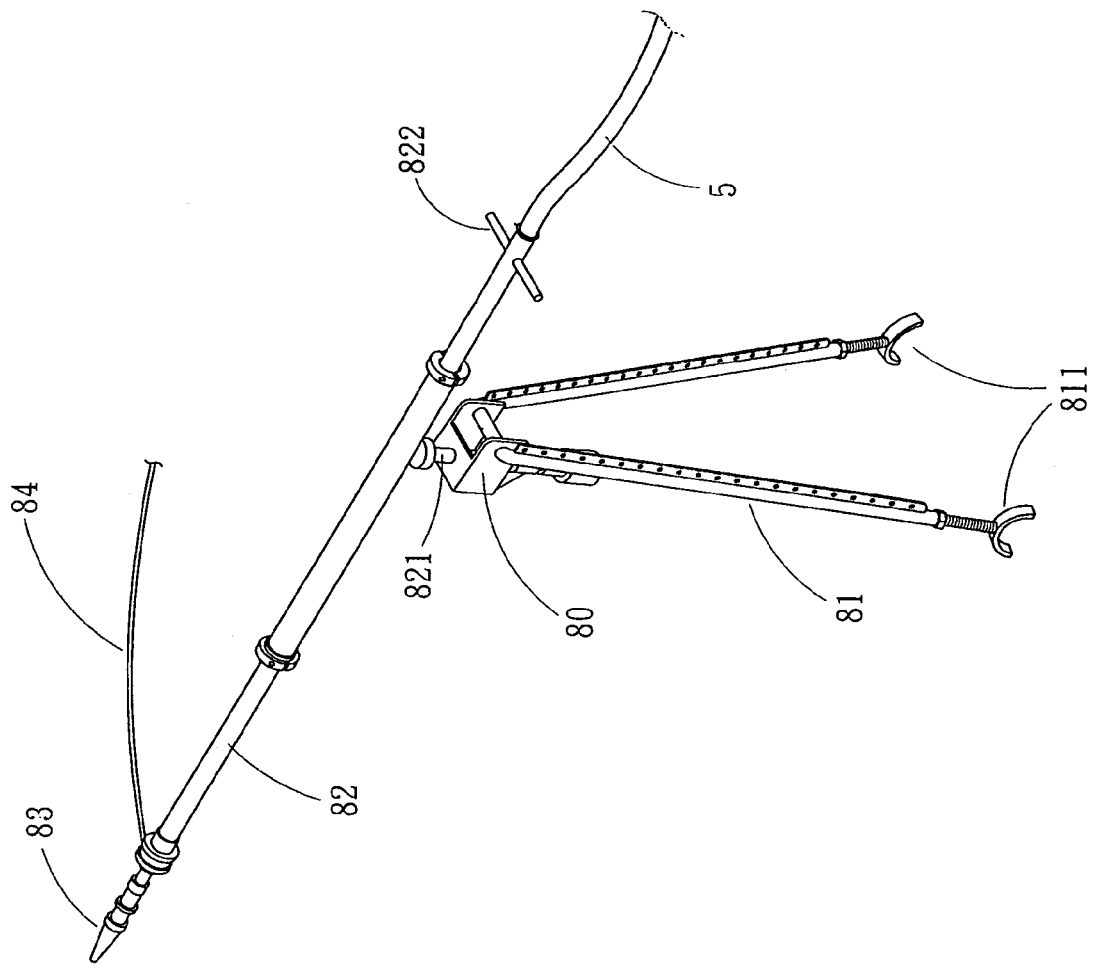
FIG. 1 is a pictorial views of the spray washer structure of insulator of the prior art.
Figure 2:
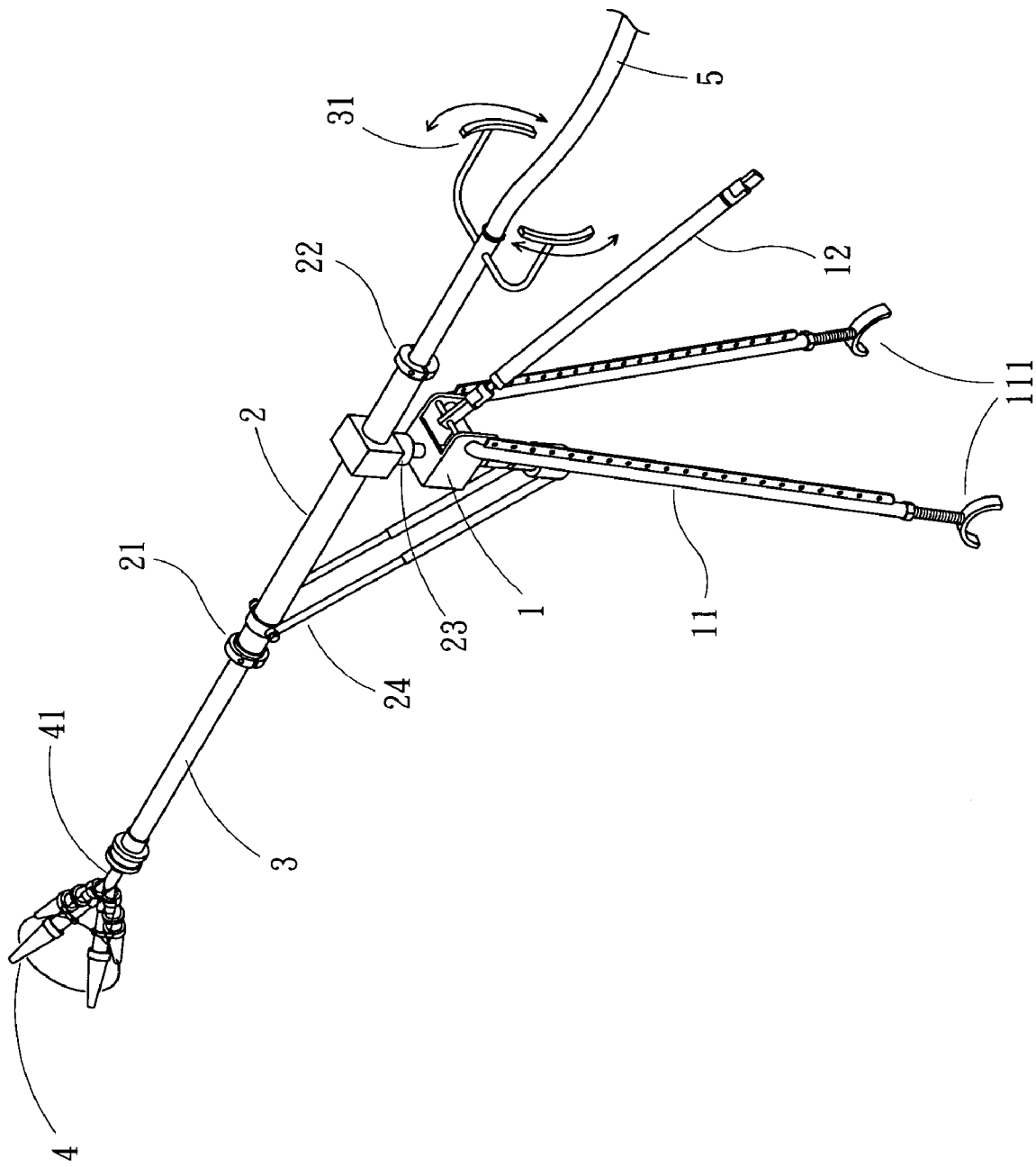
FIG. 2 is a pictorial schematic view of the main structure of the invention.
Figure 3:
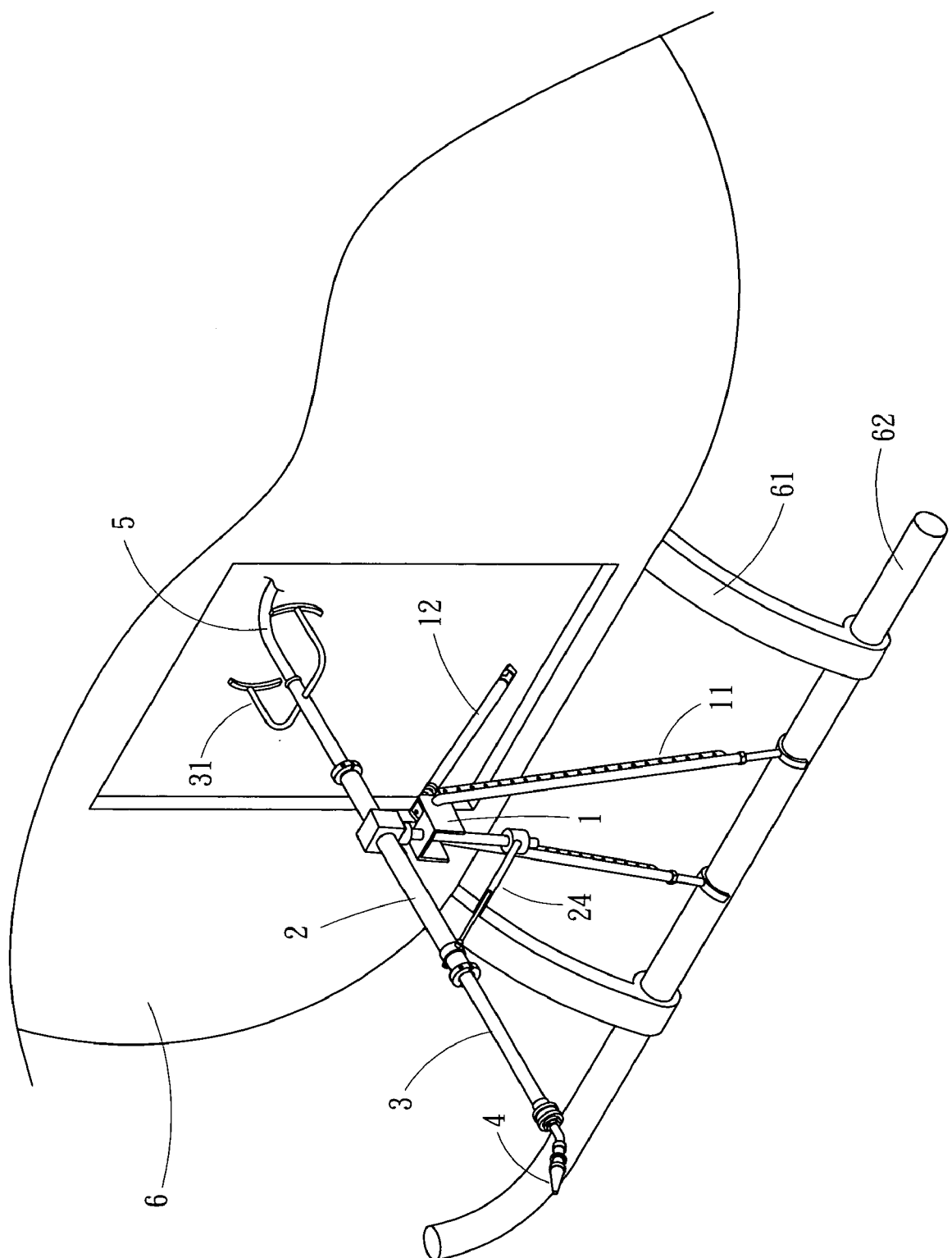
FIG. 3 is a pictorial schematic view showing the assembled structure when the invention is mounted at the aircraft.

FIG. 2 is a pictorial schematic view of the main structure of the invention and FIG. 3 is a pictorial schematic view showing the assembled structure when the invention is mounted at the aircraft. As shown in FIG. 2 and FIG. 3, the spray washer structure of the invention includes a pivot seat (1), a core tube (2), an inner tube (3), and a nozzle (4). The bottom end of the pivot seat (1) provides a plurality of legs (11) and a rear leg (12). The legs (11) have hook-talons (111) at their bottom ends for hooking at the bottom cross-bar (62) of the landing skids (61) of an aircraft (such as a helicopter) (6). Moreover, the rear leg (12) can stretch through the hatch of the aircraft (such as a helicopter) into the cabin to reach its floor to form a stable multiple-point support.

The mid-section of the core tube (2) is pivotally connected to the pivot seat (1) through a pivot (23) provided thereat. Moreover, pivoted socket seats (21), (22) are provided respectively at both ends of the core tube (2). Furthermore, an end portion of the core tube (2) is connected to at least a resilient buffer link (24) that is connected to the bottom portion of the pivot (23). What is more, the inner tube (3) having a lesser diameter than core tube (2) is passed through and secured with respect to lateral sliding by the pivoted socket seats (21), (22) making the inner tube (3) and core tube (2) in pivotally connected status. In addition, a handle (31) having a short bent bar attached on each side of the inner tube (3) positioned at its end is also provided to facilitate the holding and manipulating for the operator. Besides, the nozzle (4) is secured at the front end of the innertube (3) by an adjustable, rotatable joint (41) which is preferably formed from a flexible, but position-retaining material. In a preferred embodiment, the adjustable joint (41) is manually adjusted by a user grasping the nozzle (4) and bending the rotatable joint (41) to locate the nozzle (4) at the desired angle. The nozzle (4) is also connected to a hose (5) inserting from the front end of the inner tube (3) and passing through it to be exposed at the rear end thereof to be connected to a water source (not shown in the Figure) provided beforehand.

Figure 4:
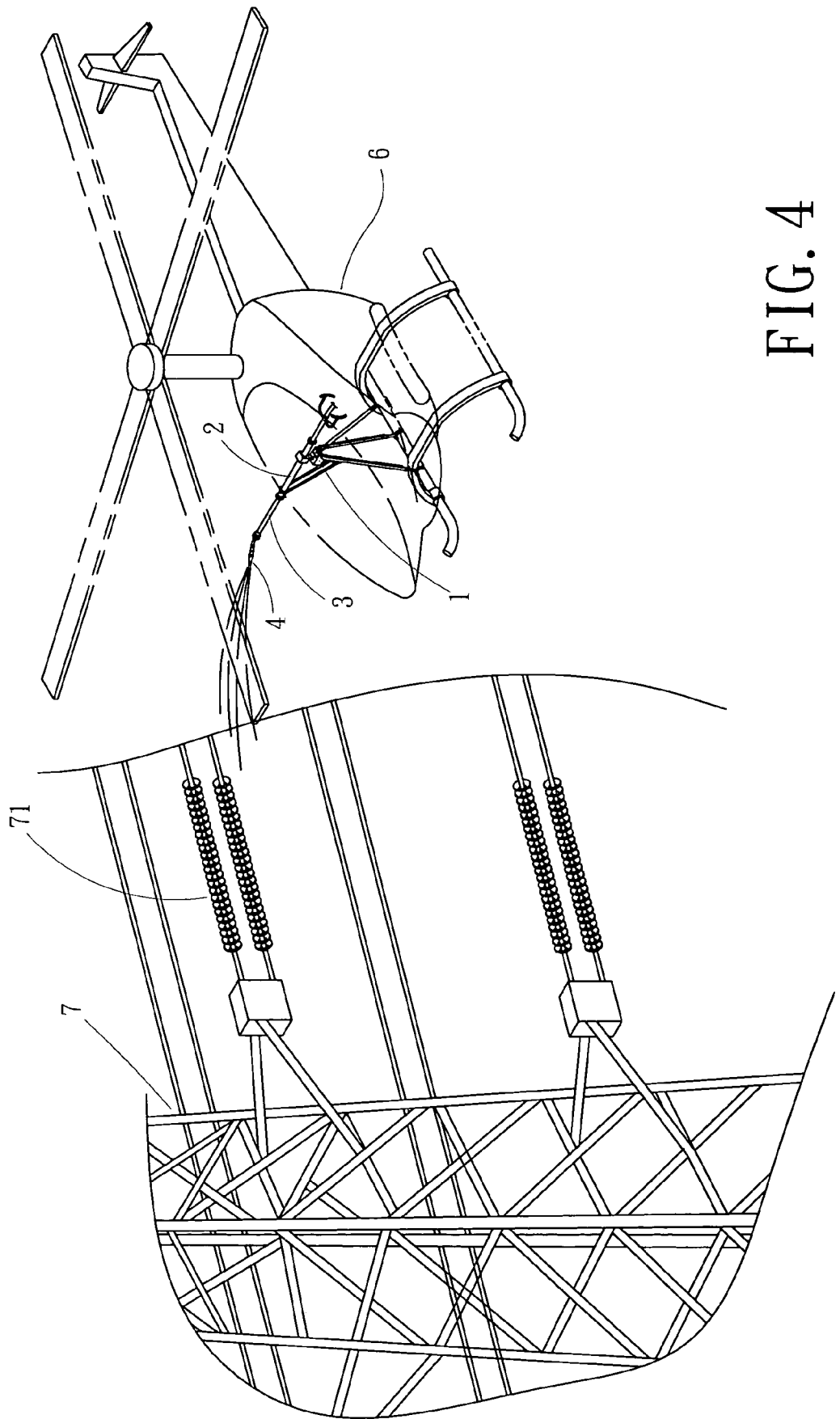
FIG. 4 is a pictorial schematic view showing the embodiment of the application of the invention.

FIG. 4 is a pictorial schematic view showing the embodiment of the application of the invention. As shown in FIG. 4, while the aircraft (6) approaches the insulators (71) of the tower (7) of the high-voltage power-transmission line, by the use of the pivoted inner tube (3) in association with the adjustable joint (41), the nozzle (4) is capable of forming various orientation in different directions to fit for the insulators (71) having different arrangement and built-up directions. In this way, not only can the spray washer structure of the invention facilitate the insulator's washing operation for the aircraft, the washing efficiency can be improved as well.

What is more, by the use of the damping effect of the resilient buffer link (24) for limiting the oscillation of the core tube (2) and inner tube (3) in perpendicular direction, the spray washer structure of the invention can avoid itself from being hit by the rotor of the helicopter.

As a conclusion, the spray washer structure of the insulator for the aircraft of the invention has the efficacies of being stable in positioning and convenient in operation. In addition, it is capable of improving the washing efficiency and lowering the operating cost too.

It will become apparent to those people skilled in the art that various modifications and variations can be made to the structure of the invention without departing from the scope or spirit of the invention. In view of the foregoing description, it is intended that all the modifications and variation fall within the scope of the following appended claims and their equivalents.

What is claimed is:

1. A spray washer structure for attaching to an aircraft and washing insulators on high-voltage power transmission lines comprising:
   a pivot seat supported by a plurality of legs, the legs being attached to the aircraft;
   a core tube pivotally connected to the pivot seat at a mid-section of the core tube via a pivot;
   an inner tube passed through and pivotable within the core tube; and
   a nozzle secured at a front end of the inner tube by an adjustable joint, the nozzle is also connected to a hose inserting from the front end of the inner tube and passing through it to be exposed at the rear end thereof to be connected to a water source;
   wherein the pivot is connected to one end portion of the core tube by the use of at least a resilient buffer link;
   a handle having a short bent bar attached on each side of the inner tube positioned at another end portion of the core tube is provided to facilitate the holding and manipulating for the operator.

* * * * *